(12) United States Patent
Wang

(10) Patent No.: US 7,942,659 B2
(45) Date of Patent: May 17, 2011

(54) INJECTION DRIVE APPARATUS FOR INJECTION MOLDING MACHINE

(75) Inventor: Jui-Hsiang Wang, Yung Kang (TW)

(73) Assignee: Hwa Chin Machinery Factory Co., Ltd., Tainan Hsien (TW)

( * ) Notice: Subject to any disclaimer, the term of this patent is extended or adjusted under 35 U.S.C. 154(b) by 46 days.

(21) Appl. No.: 12/588,272

(22) Filed: Oct. 9, 2009

(65) Prior Publication Data
US 2011/0086125 A1    Apr. 14, 2011

(51) Int. Cl.
*B29C 45/77* (2006.01)
(52) U.S. Cl. ............... 425/145; 264/40.5; 425/149
(58) Field of Classification Search ............ 425/145, 425/149, 542; 264/40.5
See application file for complete search history.

(56) References Cited

U.S. PATENT DOCUMENTS

| | | | | |
|---|---|---|---|---|
| 4,693,676 A | * | 9/1987 | Inaba | 425/145 |
| 5,129,808 A | * | 7/1992 | Watanabe et al. | 425/145 |
| 5,206,034 A | * | 4/1993 | Yamazaki | 425/145 |
| 5,645,868 A | * | 7/1997 | Reinhart | 425/145 |
| 6,619,944 B2 | * | 9/2003 | Tsai et al. | 425/149 |
| 6,733,265 B1 | * | 5/2004 | Schmidt | 425/145 |
| 7,713,049 B2 | * | 5/2010 | Maruyama et al. | 425/145 |

FOREIGN PATENT DOCUMENTS

TW    M270033    * 11/2005

* cited by examiner

*Primary Examiner* — Tim Heitbrink
(74) *Attorney, Agent, or Firm* — Rosenberg, Klein & Lee

(57) ABSTRACT

An injection drive apparatus for injection molding machines is revealed. Liquid material is fed into a mold smoothly by a material feeding screw of a material feeding mechanism. Then a reaction force is generated to push the material feeding screw when the material feeding hole is nearly full of the material. Thus the material feeding screw and the slide mechanism assembled therewith are pushed to move backward. Later the injection mechanism is driven by the slide mechanism to move and act on the drive screw. Thus the slide mechanism threaded with the drive screw is driven to push the material feeding screw moving forward and squeezing the material for injection molding. Therefore, the load of the motor is reduced dramatically and the yield rate of the products produced by injection molding is increased due to the two-stage action-feeding of the material and squeezing of the material for injection.

11 Claims, 9 Drawing Sheets

INJECTION DRIVE APPARATUS FOR INJECTION MOLDING MACHINE

BACKGROUND OF THE INVENTION

1. Fields of the Invention

The present invention relates to an injection drive apparatus for injection molding machines, especially to a driving mechanism for injection molding machines that reduces load of a motor and increases the yield rate of the injection molding products by two-stage action—initially feeding liquid plastic material into a mold smoothly and then squeezing the material for injection molding.

2. Descriptions of Related Art

As to servo injection molding machines available now, as shown in U.S. Pat. No. 5,129,808, a motor is used to drive two ball screws for further driving a rear end face, a metering motor, and related parts. The driving member includes a plurality of linear guides and guide bars that are difficult to maintain parallel to one another, move synchronously and control the precision. Moreover, due to heavier weight, the energy consumption for driving is large.

Moreover, refer to U.S. Pat. No. 4,693,676, an injection motor is used to rotate ball screws for moving a pressure plate and a screw shaft forward. And a servo motor is used to rotate the screw shaft.

Furthermore, refer to Taiwanese Pat. App. No. M270033, an injection drive apparatus for servo injection molding machines includes a barrel base, an injection base and a material feeding base, arranged with a certain interval therebetween. A barrel with a feeding screw is inserted and mounted in the barrel base and a ball screw with ball nuts and peripheral disc is inserted and disposed on the injection base and is driven by an injection motor. One end of the ball screw is connected with the feeding screw to form an axis line while the other end thereof is with a central channel with a spline nut. A spline shaft with a disc is inserted and located on the material feeding base and is driven by a material-feeding motor. One end of the spline shaft is slidingly joined with the spline nut of the ball screw so as to make the spline shaft only rotate, without axial displacement along with the ball screw. Thus the inertia (inertial force) is reduced.

Due to complicated design of the injection drive apparatus of the servo injection molding machines, there is a need to develop a new injection drive apparatus for injection molding machines.

SUMMARY OF THE INVENTION

Therefore it is a primary object of the present invention to provide an injection drive apparatus for injection molding machines in which a liquid plastic material is fed into a mold smoothly firstly and then the squeezing and injection of the plastic material are performed so as to reduce the load of a motor and increase the yield rate of the products.

In order to achieve the above object, the present invention includes a material feeding mechanism, a slide mechanism and an injection mechanism.

The material feeding mechanism is composed of a material feeder fixed and connected with a machine platform, a material inlet disposed over the material feeder and a material feeding hole arranged at a center of the material feeder. The material feeding hole is connected with the material inlet. Moreover, a material feeding screw is inserted through the material feeding hole and the machine platform is disposed with a material-feeding motor. A conveyor belt is arranged between a drive shaft of the material-feeding motor and a disc.

The slide mechanism includes a sliding slave member assembled with a rear end of the material feeding screw, a sliding master member assembled with the sliding slave member, and a positioning member with an insertion hole for insertion and positioning of the sliding master member. Furthermore, one end of the positioning member is sleeved with an axial hole of the machine platform while the other end of the positioning member is assembled with the disc of the material feeding mechanism.

The injection mechanism consists of a sleeve assembled with the sliding master member of the slide mechanism, a screw hole mounted on a center of the sleeve so as to assemble and thread with a drive screw therein and an injection motor fixed and arranged at the machine platform. The other end of the drive screw is out of an axial hole of the machine platform to connect with a disc. Moreover, a conveyor belt is disposed between a drive shaft of the injection motor and the disc.

Thereby the liquid plastic material is fed into the mold smoothly by the material feeding screw of the material feeding mechanism. Then a reaction force is created to push the material feeding screw when the material feeding hole is almost fully filled with the liquid plastic material. Now the slide mechanism assembled with the material feeding screw is also forced to move backward for buffering the reaction force. Next the injection mechanism is driven to move the drive screw so as to drive the slide mechanism pushing the material feeding screw to move forward and squeeze the plastic material for injection molding. Therefore, the load of the motor is reduced due to the two-stage action—feeding of the liquid plastic material into the mold smoothly at first and then the squeezing of the plastic material for injection. Moreover, the yield rate of the products produced by injection molding is increased.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
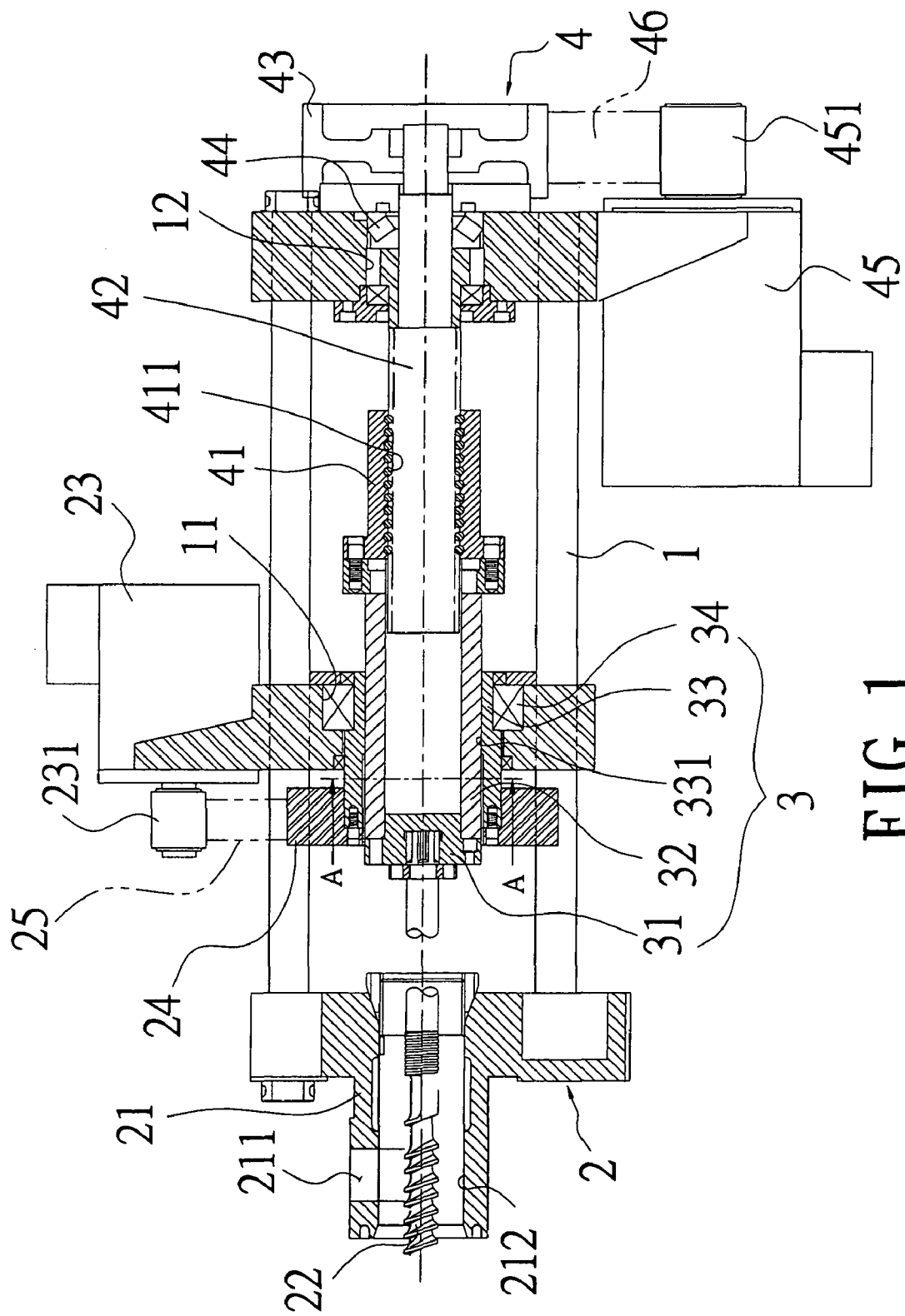
FIG. 1 is a cross sectional view of an embodiment according to the present invention.

Refer to FIG. 1, an injection drive apparatus for an injection molding machine according to the present invention includes a machine platform 1 and a material feeding mechanism 2, a slide mechanism 3 and an injection mechanism 4 all arranged at the machine platform 1.

The material feeding mechanism 2 consists of a material feeder 21 connected and fixed with the machine platform 1, a material inlet 211 disposed over the material feeder 21 and a material feeding hole 212 arranged at a center of the material feeder 21. The material feeding hole 212 is connected with the material inlet 211 and a material feeding screw 22 is inserted through the material feeding hole 212. Moreover, the machine platform 1 is disposed with a material-feeding motor 23 and a conveyor belt 25 is arranged between a drive shaft 231 of the material-feeding motor 23 and a disc 24.

Figure 2:
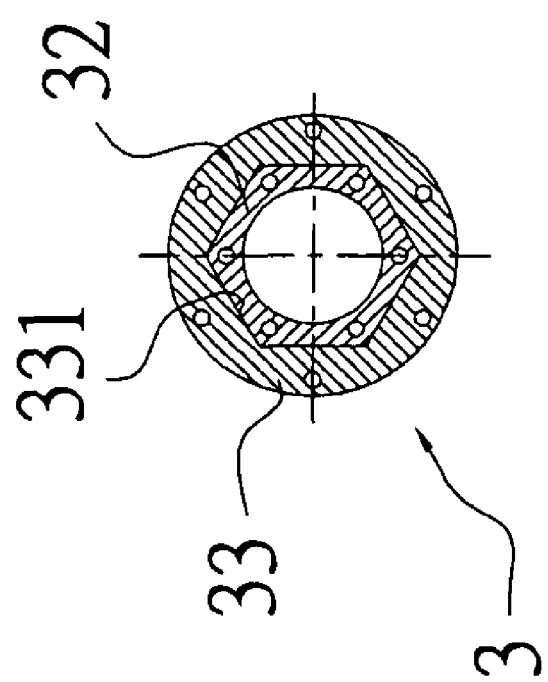
FIG. 2 is a cross sectional view along A-A line of the embodiment in FIG. 1 according to the present invention.

Also referring to FIG. 2, the slide mechanism 3 includes a sliding slave member 31 connected and assembled with a rear end of the material feeding screw 22 and a sliding master member 32 that is a polyhedron such as a hexagonal prism and is assembled with the sliding slave member 31. The slide mechanism 3 further having a positioning member 33 with an insertion hole 331 that is inserted by the sliding master member 32 for positioning and the shape of the insertion hole 331 is corresponding to the shape of the sliding master member 32. Moreover, one end of the positioning member 33 is sleeved with an axial hole 11 of the machine platform 1 and the sleeved position of the positioning member 33 with the axial hole 11 is disposed with a bearing 34 while the other end of the positioning member 33 is fixed and connected with the disc 24 of the material feeding mechanism 2.

The injection mechanism 4 is composed of a sleeve 41 so as to connect and assemble with the sliding master member 32 of the slide mechanism 3. A screw hole 411 is mounted on a center of the sleeve 41 so as to assemble and thread with one end of a drive screw 42. The other end of the drive screw 42 is out of an axial hole 12 mounted on the machine platform 1 to connect with a disc 43. A bearing 44 is disposed on the position that the drive screw 42 inserts and contacts with the axial hole 12. Furthermore, an injection motor 45 is fixed on and arranged at the machine platform 1 while a conveyor belt 46 is disposed between a drive shaft 451 of the injection motor 45 and the disc 43.

Figure 3:
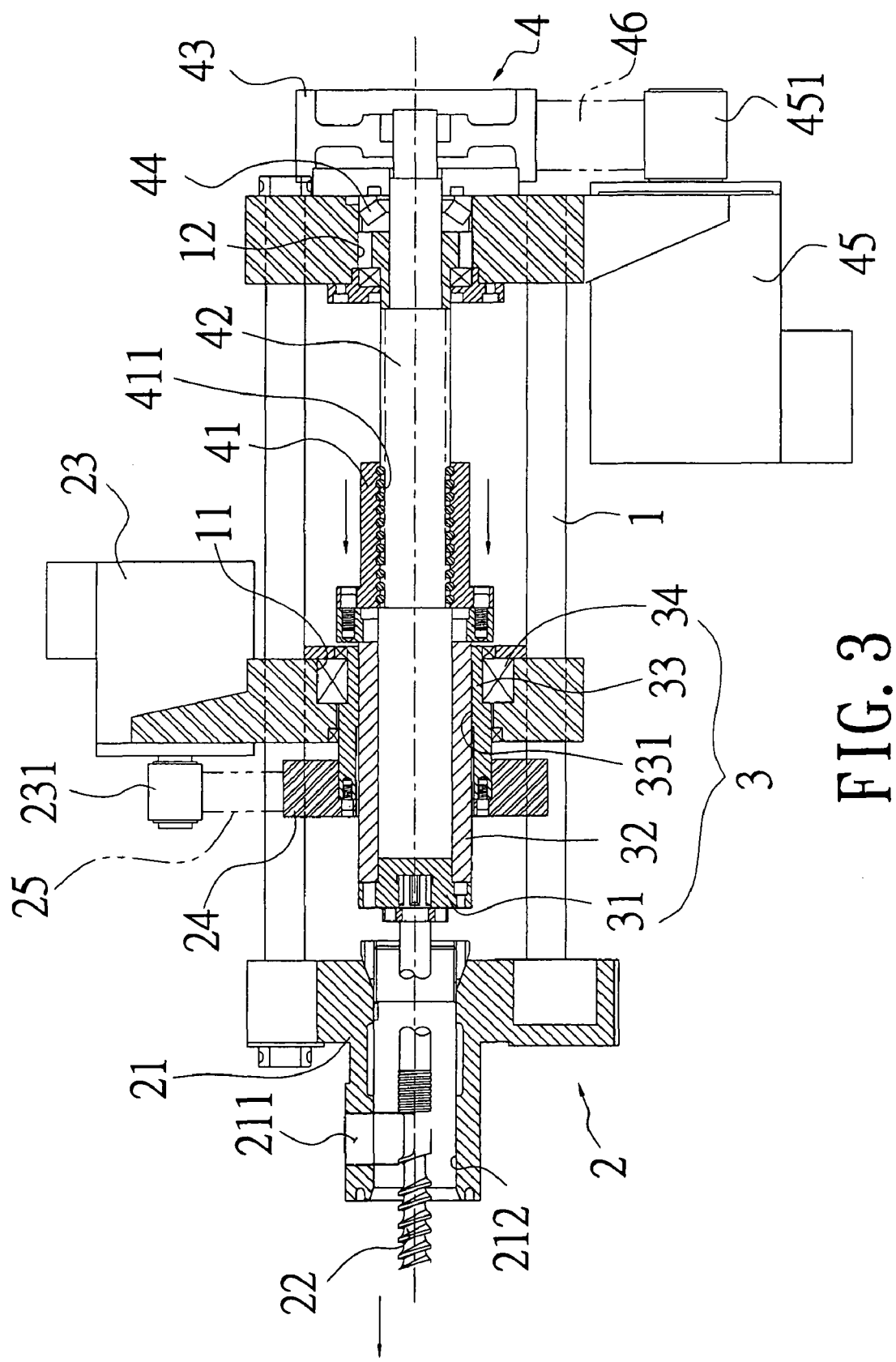
FIG. 3 is an embodiment in a use state according to the present invention.

Thereby, refer from FIG. 1 to FIG. 3, while in use, melted plastic material (liquid) is filled into a mold through the material inlet 211 of the material feeding mechanism 2. At the same time, the material-feeding motor 23 of the material feeding mechanism 2 drives the disc 24 to rotate by the conveyor belt 25.

The positioning member 33 connected and fixed with the disc 24 also rotates and the sliding master member 32 assembled with the positioning member 33 simultaneously rotates. As to the sliding slave member 31 connected with the sliding master member 32, it also drives the material feeding screw 22 assembled therewith to rotate so as to feed the liquid plastic material smoothly into the mold. Now the injection motor 45 of the injection mechanism 4 also rotates to drive the assembled drive screw 42 rotating synchronously along with the rotation speed of the sleeve 41 that is driven by the rotation of the sliding master member 32. Thus a race rotation of the drive screw 42 in the threaded sleeve 41 is available.

Moreover, when the liquid plastic material is filled into nearly a full mold by the material feeding screw 22, a reaction force is created by the liquid plastic material to push the material feeding screw 22 moving backward so that the sliding slave member 31 assembled with the material feeding screw 22 also moves backward along with the movement of the material feeding screw 22. Then the sliding master member 32 connected with the sliding slave member 31 is pushed and slid in the insertion hole 331 of the positioning member 33 to move backward.

Later the sliding master member 32 moving backward rests against the sleeve 41 of the injection mechanism 4 connected therewith. Thus the injection motor 45 of the injection mechanism 4 is triggered to actuate the drive screw 42 rotating counterclockwise (reversely) so as to drive the sleeve 41 threaded therewith moving backward.

Next when the sleeve 41 arrives at the location, the injection motor 45 of the injection mechanism 4 drives the drive screw 42 rotating clockwise and the rotating drive screw 42 immediately drives the sleeve 41 threaded therewith moving forward.

While the sleeve 41 is moving forward, the sliding master member 32 connected therewith is pushed to move forward and further to drive the sliding slave member 31 and the material feeding screw 22, both assembled with the sliding master member 32, to move forward and further push the liquid plastic material into the mold. Thus the mold is filled with the plastic material precisely and the injection molding is accomplished. Thereby the material feeding and material squeezing (extrusion) are performed in two stages. Thus, the motor load is reduced and the cost of energy used to drive the motor is down. Furthermore, because the liquid plastic material is fed and mixed fully into the mold and then is squeezed to be injected, the yield rate of the injection molding parts is increased.

Figure 4:
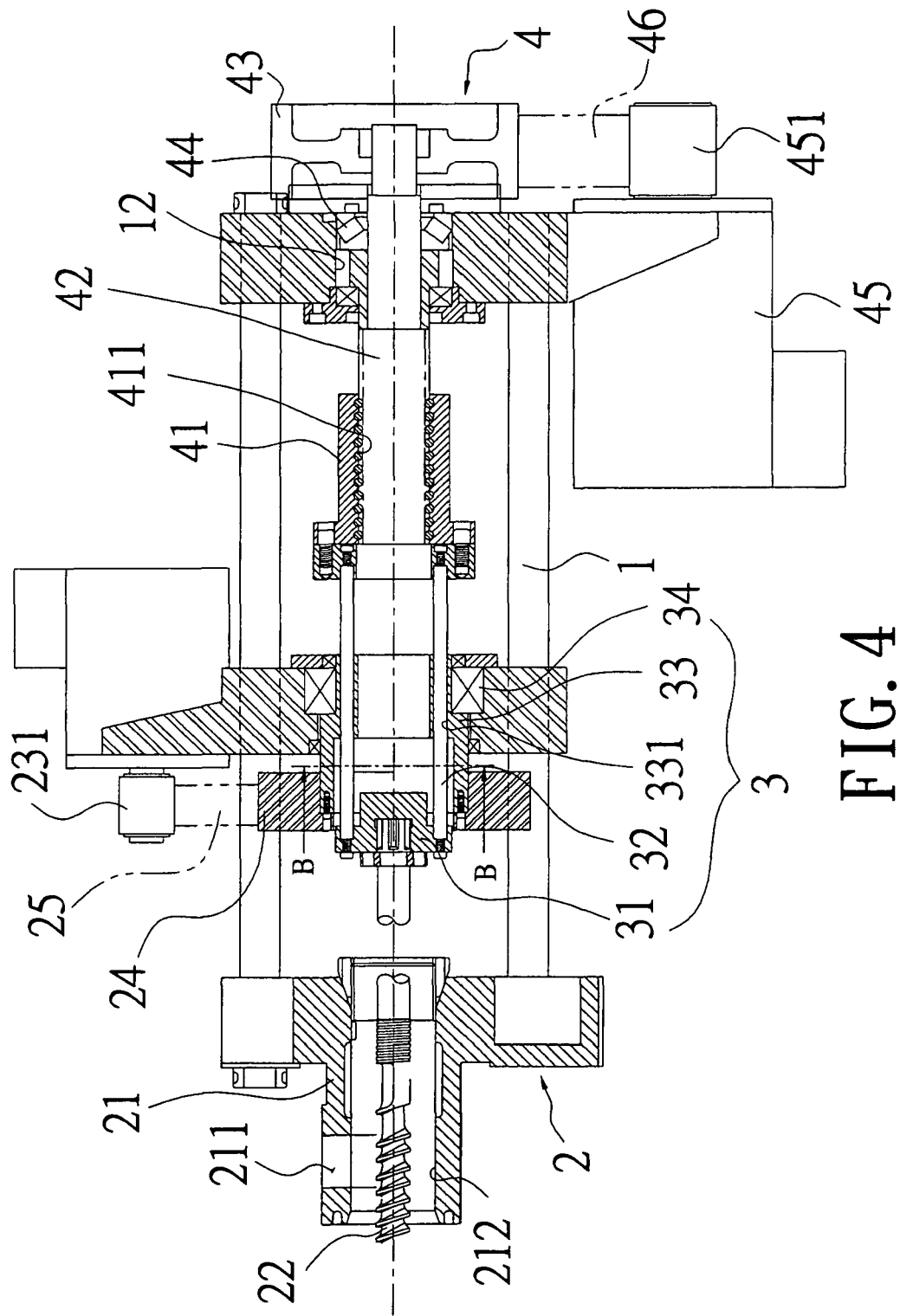
FIG. 4 is a cross sectional view of another embodiment according to the present invention.
Figure 5:
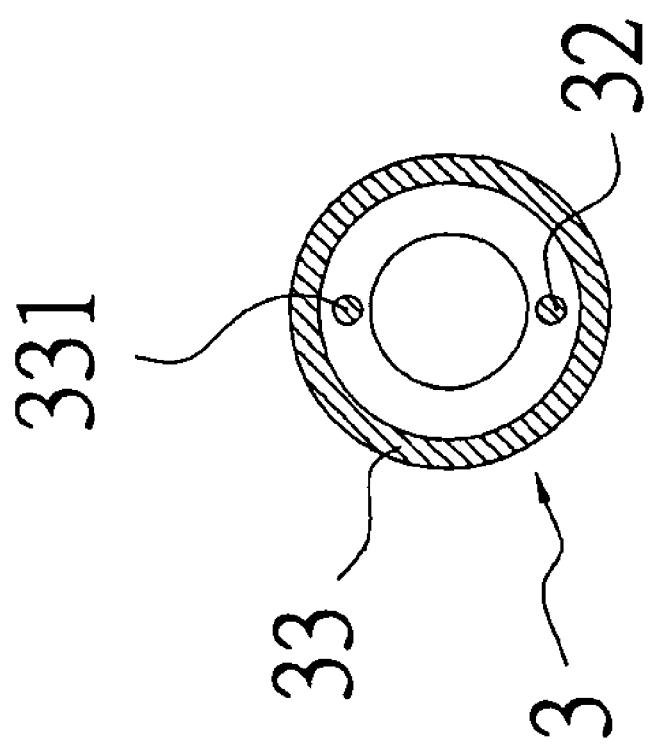
FIG. 5 is a cross sectional view along B-B line of the embodiment in FIG. 4 according to the present invention.
Figure 6:
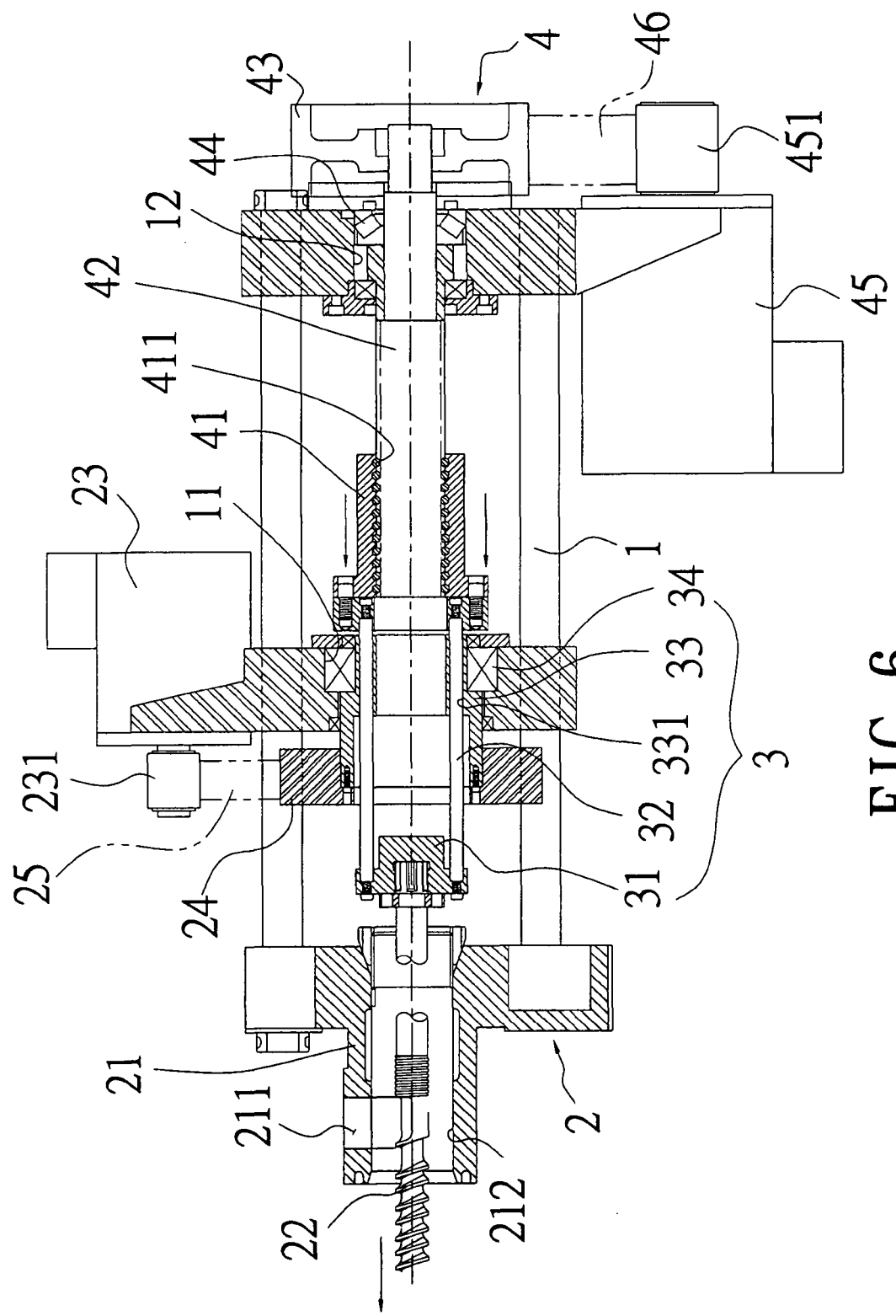
FIG. 6 shows the embodiment in a use state according to the present invention.

Refer from FIG. 4 to FIG. 6, another embodiment of the present invention is revealed. The sliding master member 32 connected between the sliding slave member 31 and the sleeve 41 are formed by at least two guiding rods and the positioning member 33 is disposed with at least two insertion holes 331 corresponding to the two guiding rods to be assembled with and inserted by the sliding master member 32. Thereby the sliding master member 32 moves along with the material feeding mechanism 2 to drive the injection mechanism 4.

Figure 7:
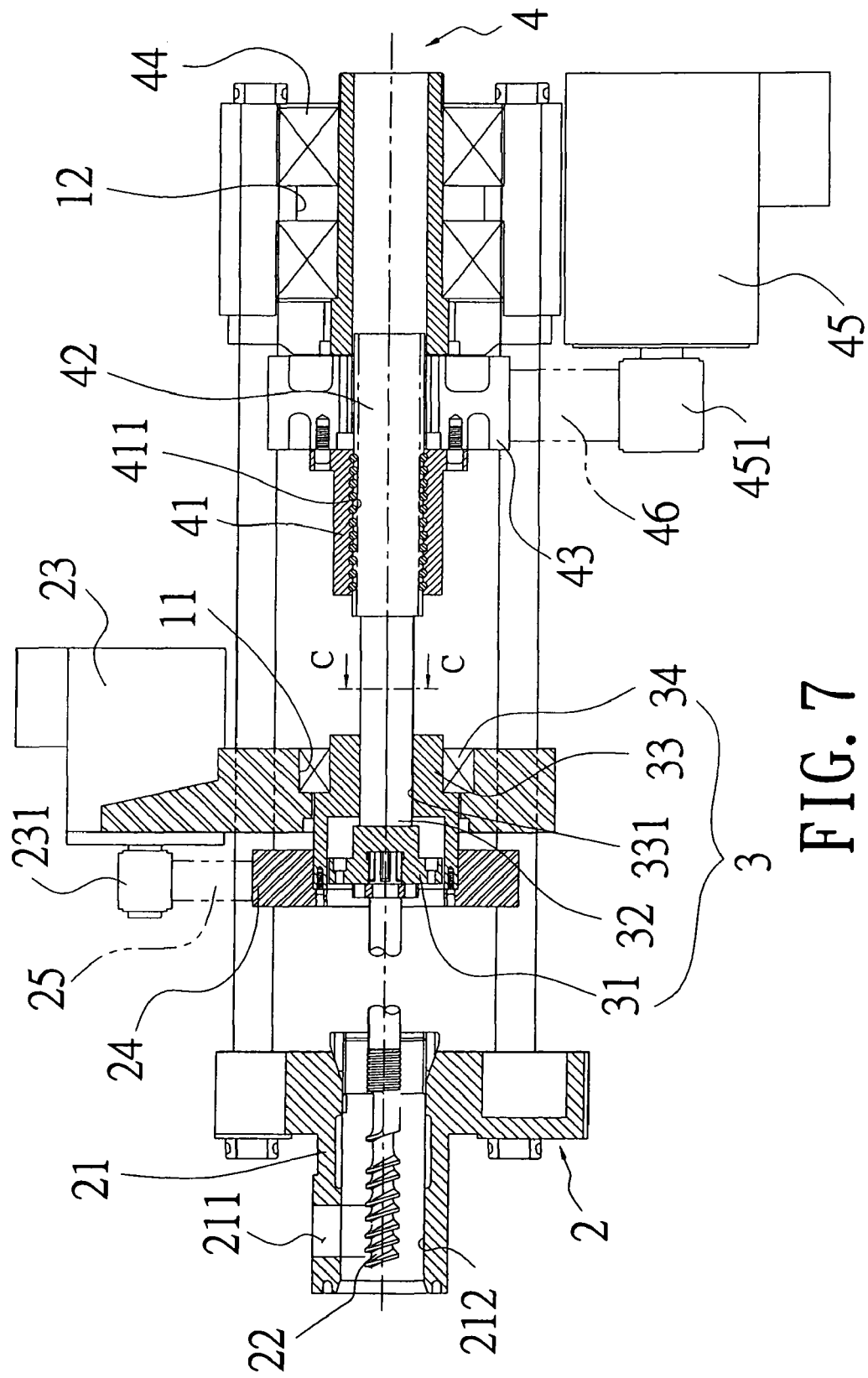
FIG. 7 is a cross sectional view of a further embodiment according to the present invention.
Figure 8:
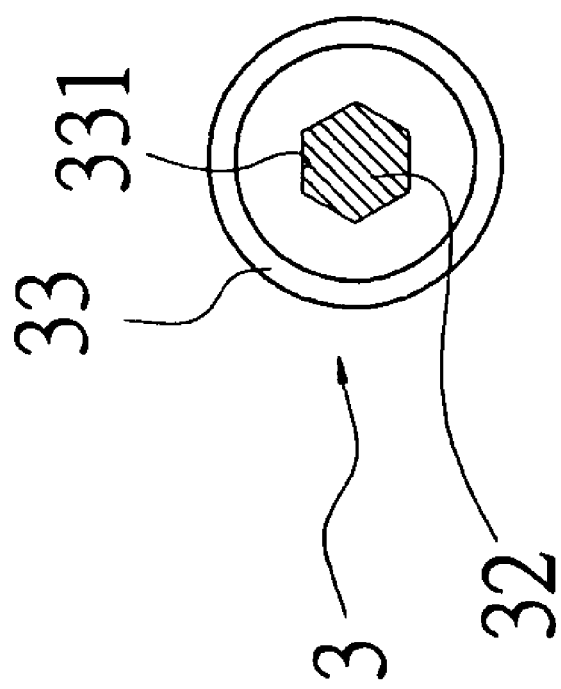
FIG. 8 is a cross sectional view along C-C line of the embodiment in FIG. 7 according to the present invention.

Refer to FIG. 7 and FIG. 8, a further embodiment is disclosed. In this embodiment, the sliding master member 32 is a polyhedron such as a hexagonal prism that connects between the sliding slave member 31 and the drive screw 42. Moreover, an insertion hole 331 whose shape is corresponding to the sliding master member 32 (such as a hexagonal hole) is mounted on a center of the positioning member 33. The sleeve 41 of the injection mechanism 4 is assembled and connected with the disc 43.

Figure 9:
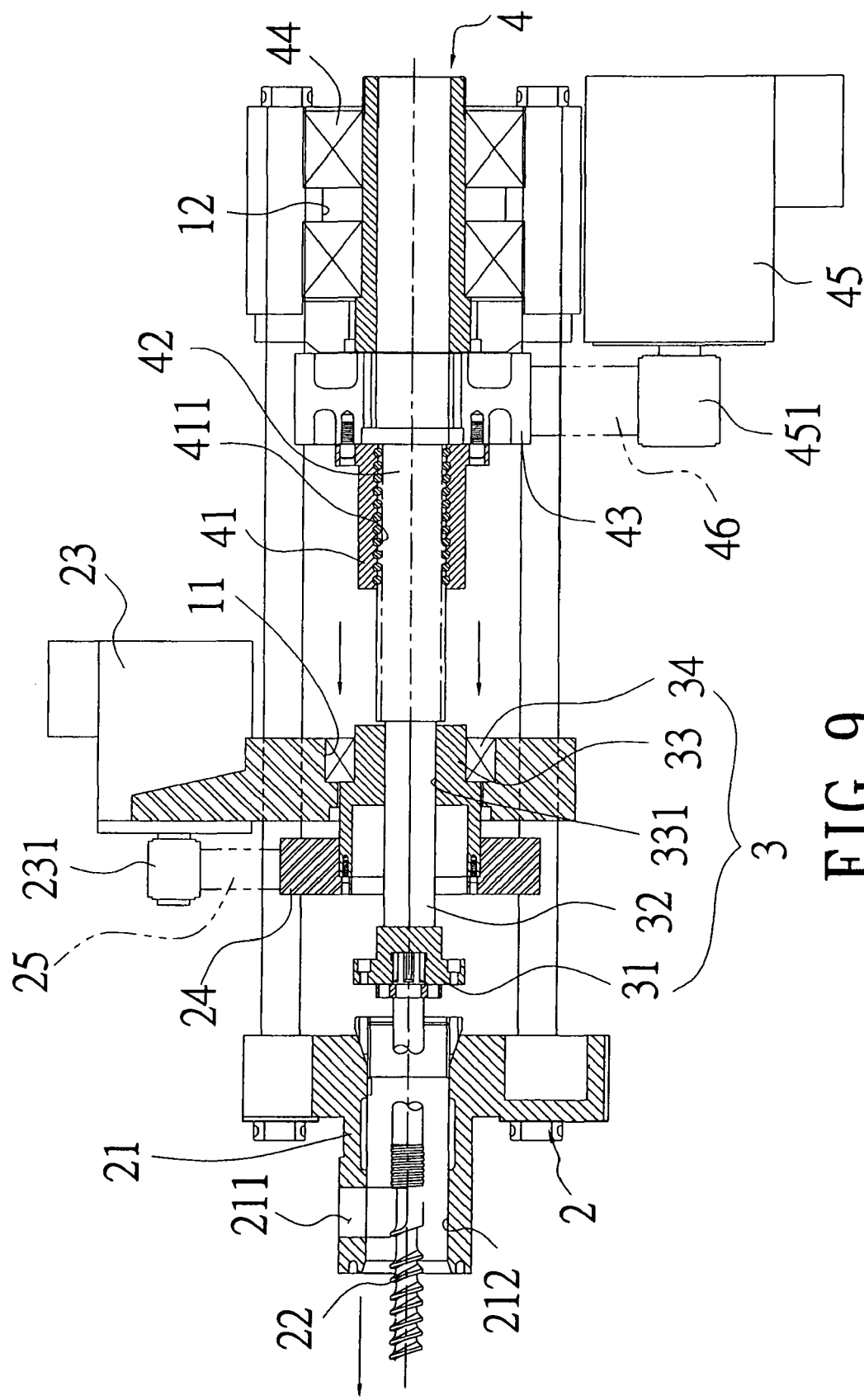
FIG. 9 shows the embodiment in a use state according to the present invention.

In use, refer to FIG. 9, the material-feeding motor 23 of the material feeding mechanism 2 drives the disc 24 to rotate by the conveyor belt 25. Thus the positioning member 33 connected with the disc 24 also rotates and the sliding master member 32 inserted in the positioning member 33 also rotates along with the positioning member 33 by the assembly of the polyhedron with the hole. Along with the rotation of the positioning member 33, the sliding slave member 31 and the material feeding screw 22 connected therewith are driven to rotate and mix the material so as to make the liquid plastic material feed into the mold smoothly. When the mold is nearly filled with the plastic material, the reaction force of the liquid plastic material acts on the material feeding screw 22 so that the material feeding screw 22 moves backward. The sliding slave member 31 and the sliding master member 32 connected with the material feeding screw 22 also move backward to push the drive screw 42 that is connected with the sliding master member 32 moving backward. Now the injection motor 45 is triggered simultaneously to rotate counterclockwise for driving the disc 43 and the sleeve 41 that is fixed on and connected with the disc 43. Thus the drive screw 42 is driven to move to the location.

Then the injection motor 45 drives the disc 43 to rotate by the by the conveyor belt 46. And the sleeve 41 fixed on and connected with the disc 43 also rotates so as to drive the drive screw 42 threaded therewith moving forward and further pushing the sliding master member 32 connected as well as the sliding slave member 31 connected with the sliding master member 32 to move forward. Thus the material feeding screw 22 fixed and connected with the sliding slave member 31 is pushed to move forward for squeezing the plastic material.

In summary, according to the above structure and embodiments, the present invention has following advantages:

1. The present invention includes the material feeding mechanism, the slide mechanism and the injection mechanism. By the material feeding screw of the material feeding mechanism, the liquid plastic material filled is fed into the mold smoothly. When the liquid plastic material is fed into nearly the full mold, a reaction force is created to push the material feeding screw. And the slide mechanism assembled with the material feeding screw is also forced to move backward for buffering the reaction force. Then the injection mechanism is driven to move the drive screw so as to drive the slide mechanism pushing the material feeding screw to move forward and squeeze the plastic material for injection molding. Thereby the load of the motor is reduced due to the two-stage action—feeding of the liquid plastic material into the mold smoothly at first and then the squeezing of the plastic material for injection.

2. The present invention includes the material feeding mechanism, the slide mechanism and the injection mechanism. By the material feeding mechanism, the liquid plastic material is fed into the mold and then the injection mechanism is driven to squeeze and inject the plastic material. Thus the squeezing and injection of the plastic material is performed after the liquid plastic material is fully fed into the mold. Therefore, the yield rate of the products made by injection molding is improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An injection drive apparatus for injection molding machines comprising a material feeding mechanism, a slide mechanism and an injection mechanism;
   wherein the material feeding mechanism having a material feeder fixed and connected with a machine platform, a material inlet disposed over the material feeder and a material feeding hole arranged at a center of the material feeder; the material feeding hole is connected with the material inlet and a material feeding screw is inserted through the material feeding hole while the machine platform is disposed with a material-feeding motor and a conveyor belt is arranged between a drive shaft of the material-feeding motor and a disc;
   the slide mechanism includes a sliding slave member assembled with a rear end of the material feeding screw, a sliding master member assembled with the sliding slave member, and a positioning member with an insertion hole for insertion and positioning of the sliding master member; one end of the positioning member is sleeved with an axial hole disposed on the machine platform while the other end of the positioning member is assembled with the disc of the material feeding mechanism;
   the injection mechanism includes a sleeve to connect and assemble with the sliding master member of the slide mechanism and a screw hole is mounted on a center of the sleeve so as to assemble and thread with a drive screw while the other end of the drive screw is out of an axial hole on the machine platform to connect with a disc; an injection motor is fixed on and arranged at the machine platform and a conveyor belt is disposed between a drive shaft of the injection motor and the disc.

2. The device as claimed in claim 1, wherein the sliding master member is a polyhedron and a shape of the insertion hole of the positioning member is corresponding to the shape of the sliding master member.

3. The device as claimed in claim 2, wherein the sliding master member is a hexagonal prism and the insertion hole of the positioning member is a hexagonal hole corresponding to the hexagonal prism of the sliding master member.

4. The device as claimed in claim 1, wherein the sliding master member are formed by at least two guiding rods and the positioning member is disposed with at least two insertion holes corresponding to the two guiding rods of the sliding master member so as to assemble with and insert with the two guiding rods of the sliding master member.

5. The device as claimed in claim 1, wherein a bearing is disposed on a position that the positioning member is sleeved with the axial hole on the machine platform.

6. The device as claimed in claim 1, wherein a bearing is disposed on a position that the drive screw inserts and connects with the axial hole on the machine platform.

7. An injection drive apparatus for injection molding machines comprising a material feeding mechanism, a slide mechanism and an injection mechanism; wherein
   the material feeding mechanism having a material feeder fixed and connected with a machine platform, a material inlet disposed over the material feeder and a material feeding hole arranged at a center of the material feeder; the material feeding hole is connected with the material inlet and a material feeding screw is inserted through the material feeding hole while the machine platform is disposed with a material-feeding motor and a conveyor belt is arranged between a drive shaft of the material-feeding motor and a disc;
   the slide mechanism includes a sliding slave member assembled with a rear end of the material feeding screw, a sliding master member assembled with the sliding slave member, and a positioning member with an insertion hole for insertion and positioning of the sliding master member; one end of the positioning member is sleeved with an axial hole disposed on the machine platform while the other end of the positioning member is assembled with the disc of the material feeding mechanism;
   the injection mechanism includes a sleeve with a screw hole mounted on a center of the sleeve so as to assemble and thread with a drive screw, and an injection motor fixed and arranged at the machine platform; one end of the drive screw is assembled with the sliding master member and the sleeve is assembled with a disc of the injection mechanism while a conveyor belt is disposed between a drive shaft of the injection motor and the disc.

8. The device as claimed in claim 7, wherein the sliding master member is a polyhedron and a shape of the insertion hole of the positioning member is corresponding to the shape of the sliding master member.

9. The device as claimed in claim 8, wherein the sliding master member is a hexagonal prism and the insertion hole of the positioning member is a hexagonal hole corresponding to the hexagonal prism of the sliding master member.

10. The device as claimed in claim 7, wherein a bearing is disposed on a position that the positioning member is sleeved with the axial hole on the machine platform.

11. The device as claimed in claim 7, wherein a bearing is disposed on a position that the drive screw inserts and connects with the axial hole on the machine platform.

* * * * *